Sept. 7, 1943. D. C. DRILL ET AL 2,328,714
APPARATUS AND METHOD WHEREBY IMPROVED MINERAL
WOOL FIBERS AND PRODUCTS MAY BE MADE
Filed March 19, 1941 4 Sheets-Sheet 3
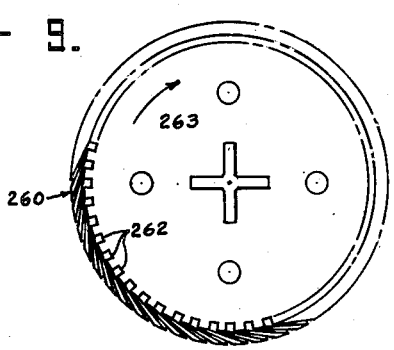
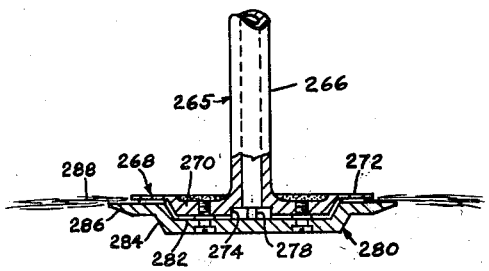
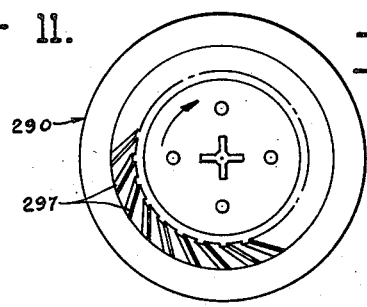
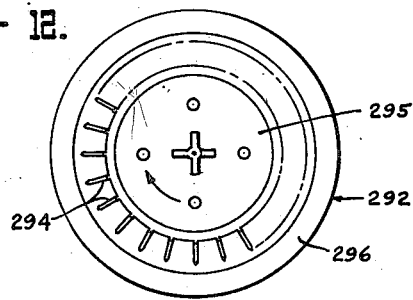
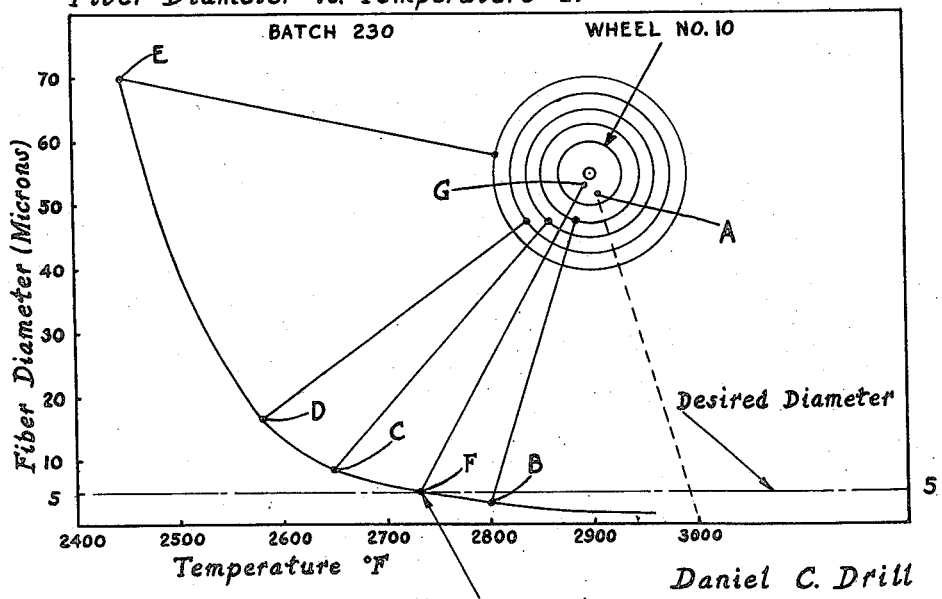
Daniel C. Drill
Carlton C. Davis
INVENTORS
BY Carlton C. Davis
ATTORNEY.

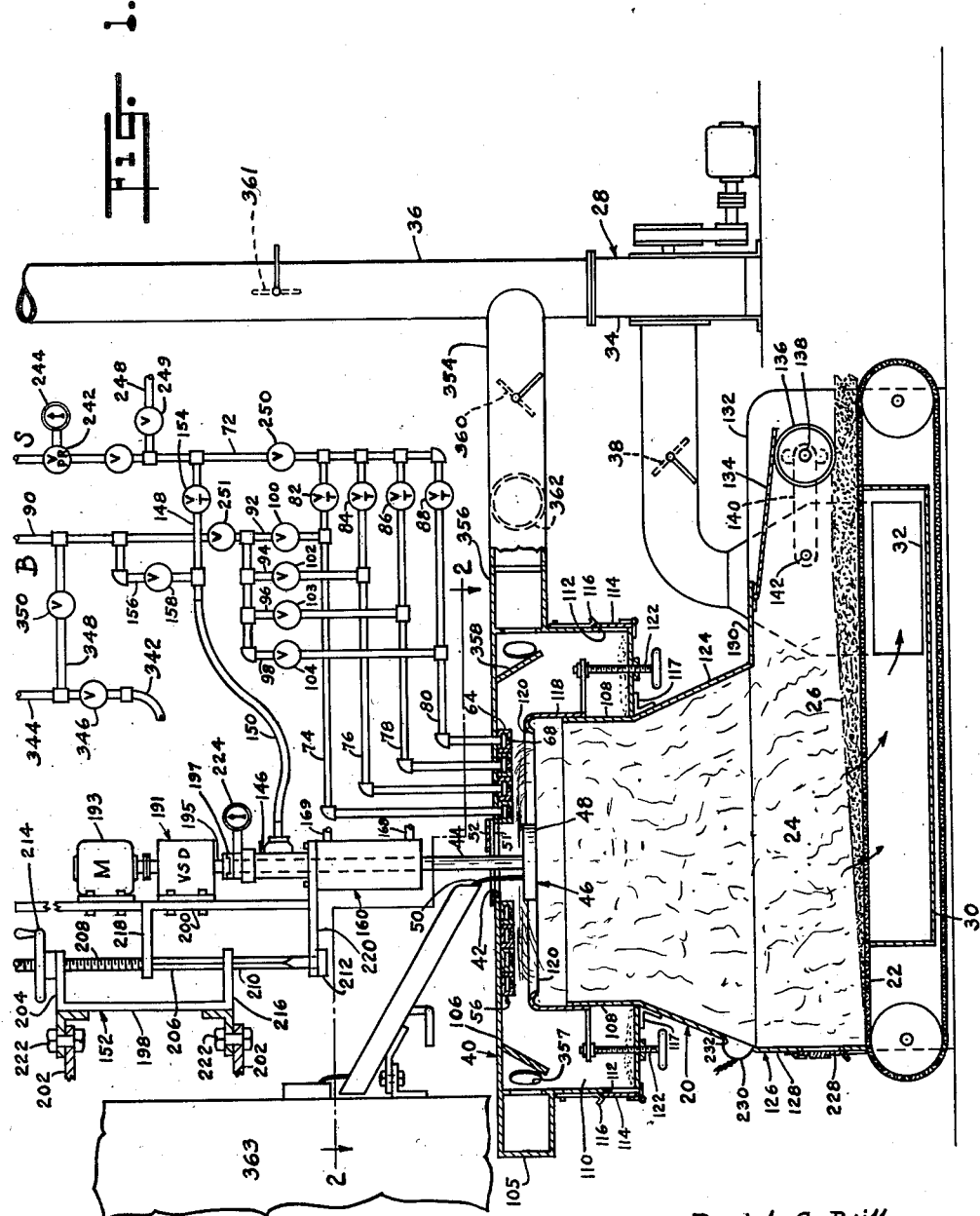

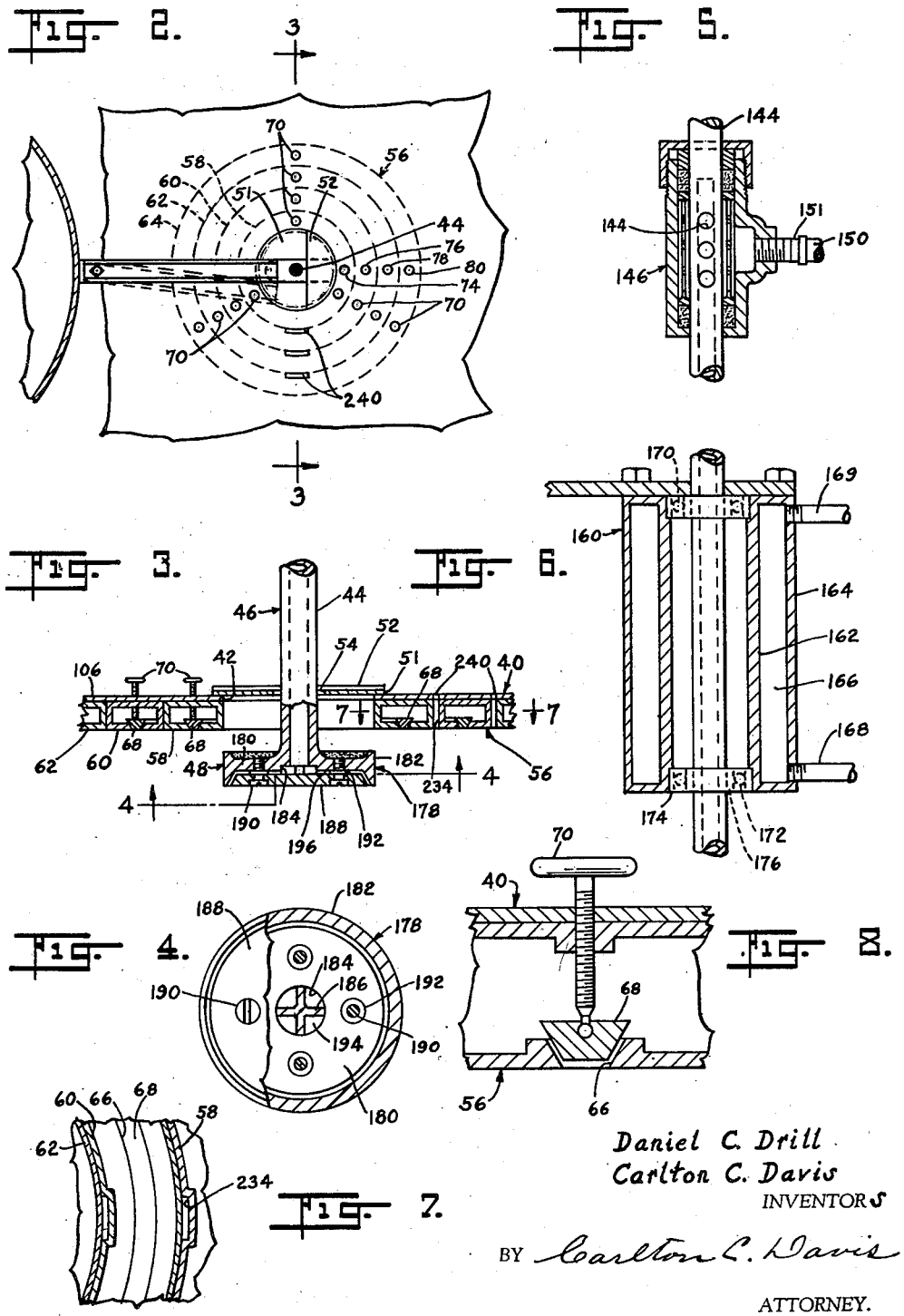

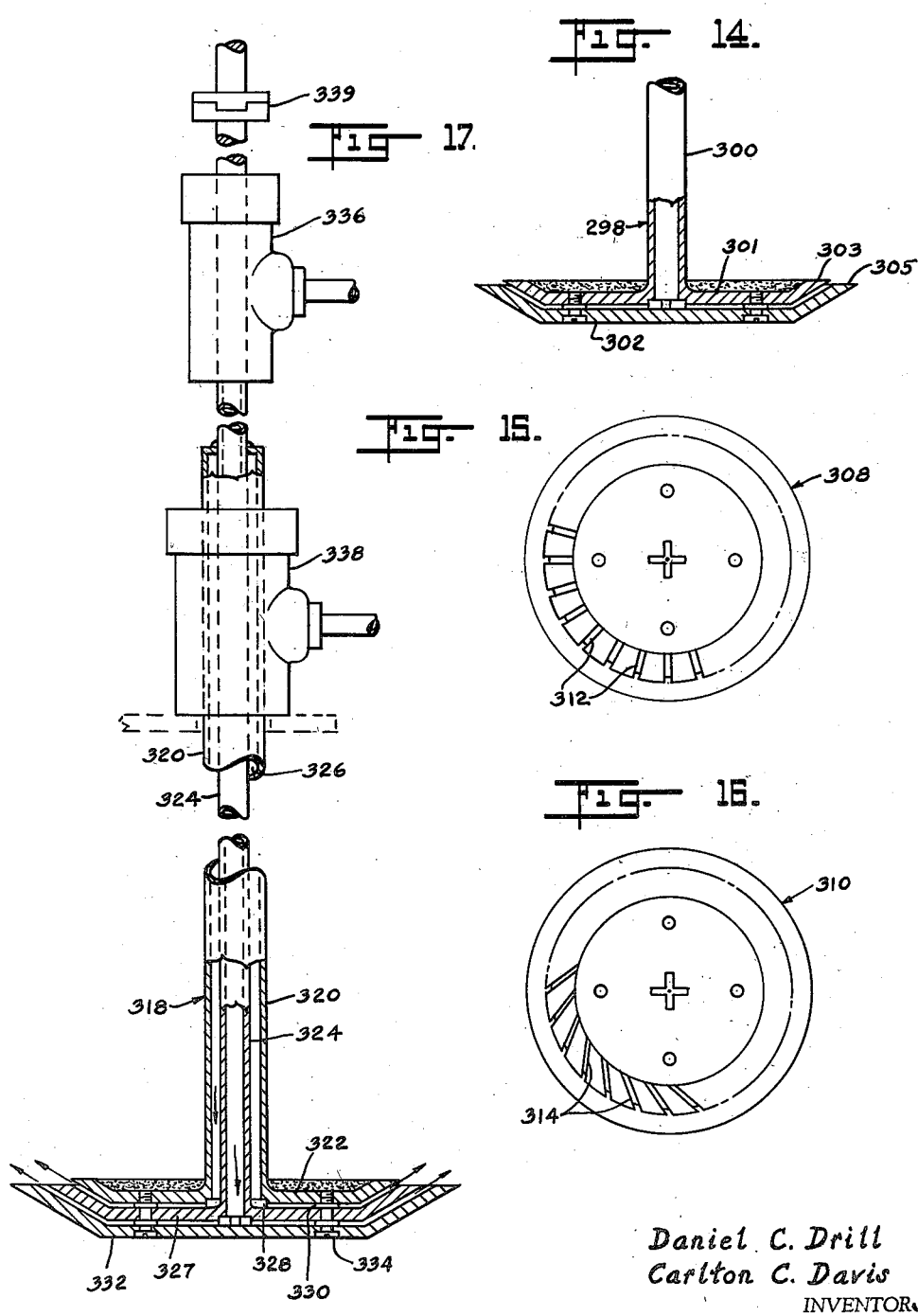

Patented Sept. 7, 1943

2,328,714

UNITED STATES PATENT OFFICE

2,328,714

APPARATUS AND METHOD WHEREBY IMPROVED MINERAL WOOL FIBERS AND PRODUCTS MAY BE MADE

Daniel C. Drill and Carlton C. Davis, Wabash, Ind., assignors to American Rock Wool Corporation, Wabash, Ind., a corporation of Indiana Application March 19, 1941, Serial No. 384,222

10 Claims. (Cl. 83—91)

This invention generally relates to apparatus and methods whereby improved mineral wool fibers and mineral wool products may be made from any suitable molten mineral materials such as wool rock, slag, or glass. It more particularly relates to the provision of ways and means adapted to improve rock and slag wool products and thereby aid the manufacturers of these products. In the heat insulating field there is a well recognized distinction between the terms "mineral wool" and "glass wool." Both of these products are formed by shredding suitably molten mineral materials into siliceous artificial fibers.

In producing mineral wool, the raw materials include a major proportion of relatively impure substances such as rock, slag and cinders whose chemical and physical characteristics vary within wide limits. Glass wool, on the other hand, is made from relatively pure materials such as glass marbles, cullet, selected sand and sodium carbonate, whose chemical and physical characteristics are well known to the manufacturers and relatively invariable.

Another distinction lies in the fact that the glass wool melts are ordinarily so high in their silica content and so high on the acid side that they may be melted in reverbertory glass tanks without materially corroding or fluxing the refractory walls of these tanks whereas the mineral wool melted materials corrodes or otherwise destroys these walls to such an extent as render the cost of maintaining the operation of these glass tanks prohibitive. For this reason, in the present state of the art, mineral wool raw materials are ordinarily melted in water cooled metal lined cupolas. Now as is well known in the art, the operating temperature of the reverbertory glass tanks can, in practice, be maintained and controlled within close limits but the operating temperature of the cupolas often vary uncontrollably in actual practice because of conditions beyond the control of the operator.

It is also well known that glass melts have a long viscosity range within which the molten glass material may be readily fiberized whereas the corresponding range of the mineral wool melts are much shorter and more variable. This variation is chiefly due to the chemical variations in the relatively impure materials used. The problems encountered in the production of mineral wool are therefore different and much more difficult than are those found in the glass wool industry.

The producers of mineral wool have repeatedly sought to overcome the above mentioned disadvantages by adding fluxes and other substances to the slag and wool rock raw materials, by providing improved methods of melting these materials and by devising various types of blow caps, but they have been at last forced to the conclusion that in commercial production the slag and rock wool manufacturers must accept the fact that the viscous irregularities of the molten wool rock and slag streams will continue, in spite of all that can be done. For this reason the applicants maintain that the most feasible angle of attack on this problem is to provide apparatus and methods adapted to shred mineral wool fibers efficiently from streams having these viscous irregularities and such is one of the major purposes of this invention.

Briefly, in carrying out one form of this invention use is made of apparatus and methods whereby the spinning operator may (1) Spread the lava stream into a thin mass, sheet, or film, one end of which is highly heated and has a low viscosity and the other end of which is appreciably cooler and has a relatively higher viscosity within the fluid range, and then (2) Apply a shredding blast to the lava at the line or place on the mass or sheet having the desired viscosity.

A preferred form of this invention contemplates the employment of a spinning wheel which is preferably adapted to be rotated at widely varying angular velocities and an annular steam or air blast nozzle construction encircling the longitudinal axis of said spinning wheel. This construction is preferably provided with a plurality of nozzle chambers each of which has a circular orifice adapted to direct a circular blast downwardly around the spinning wheel in a manner adapted to shred the lava into fibers.

These orifices are spaced apart from each other and are preferably either co-axial or concentric with each other and with the centerline of the shaft of the spinning wheel. In carrying out the preferred method, a stream of highly heated lava having a low viscosity is discharged preferably through a swingably mounted trough upon the rotating wheel.

This wheel hurls the lava outwardly in a thin, annular mass which usually assumes the form of a sheet or film having a plurality of fibers extending outwardly therefrom. This mass is, in the spinning operation, projected by centrifugal force beyond the periphery of the spinning wheel and its inner portions are, of course, relatively highly heated and have a low viscosity while its outer portions are cooler and have a relatively high velocity.

Suitable valve means are also preferably provided whereby a steam or compressed air blast may be directed through any or all of the orifices at the will of the operator at varying volumes and velocities.

In beginning the spinning operation, the lava is discharged on the rotating spinning wheel. Then the operator preferably directs a shredding blast through one of the orifices and observes the viscosity of the stream and the type of fibers being formed. If the fibers thus initially produced are larger in diameter than is desired, the operator may then shut off the steam from that orifice and use the next inner orifice whose blast will shred the lava at a higher temperature and a lower viscosity and thereby produce fibers of smaller diameters. On the other hand, if fibers of larger diameter are desired, the operator uses an outer blast orifice whose blast shreds the lava at a lower temperature and a higher viscosity and thereby produces fibers of a larger diameter.

It will be noted that by this method, insofar as it has been described, the operator is only enabled to shred the fibers at spaced apart lines or positions on the mass, each of which have at that instant a definite viscosity, and that the operator is not (insofar as has been described) able to shred the lava at intermediate viscosities. This, however, he may do by merely swinging the movable trough in such a manner that it will discharge the molten stream closer or farther away, as the case may be, from the center of the spinning wheel. If the stream be moved toward the center of the spinning wheel, the inner end of the molten annular mass is moved further away from each of the annular orifices thereby increasing the viscosity of the lava where it is then being shredded by one of the shredding blasts. If the lava is moved towards the periphery of the spinning wheel, the inner end of the lava sheet is, of course, moved nearer towards the orifices, thereby decreasing the viscosity of the mass where it is being blown by any particular blast.

It is also an object of this invention to provide various other methods and means whereby the operator is enabled to observe or otherwise learn of the condition of the lava and vary or control the characteristics of the fibers being formed, but these methods and means may be better understood after first reading the description of the apparatus of this invention.

Another object is the provision of ways and means for producing mineral wool fibers of different types and more uniform fibers of each of said types. Briefly this is achieved by varying the strength and the manner of the application of the shredding forces employed in producing these fibers.

A further object is the provision of an improved spinning apparatus including a spinning wheel, the angular velocity of which may be rapidly changed at the will of the operator.

A further object is provision of spinning apparatus adapted to form mineral fibers by the application of both centrifugal force and one or more fluid blasts.

Another object is the provision of spinning apparatus of the character described in which both the centrifugal force and the power of the fluid blast may be varied at the will of the operator.

A further object of our invention is to provide a combined spinning wheel and a reaction turbine adapted to be driven at infinitely variable speeds.

A further object is the provision of a means and method whereby various types of fibers may be simultaneously produced and intermingled with each other in a forming blanket or batt.

The other and further objects of our invention will become apparent from the accompanying drawings and the following disclosure and claims.

In the drawings:

Figure 1 is a partly elevational and partly sectional view of a preferred embodiment of our invention, Figure 2 is a top plan view taken along the line 2—2 of Figure 1, Figure 3 is a partly elevational and partly sectional view taken along the line 3—3 of Figure 2, Figure 4 is a view taken along the line 4—4 of Figure 3, Figures 5 and 6 are broken cross sectional views showing portions of the spinning wheel shaft seen in Figure 1 and parts associated therewith, Figure 7 is an enlarged fragmentary view taken along the line 7—7 of Figure 3, Figure 8 is an enlarged sectional view showing one of the nozzle valve constructions seen in Figure 3, Figure 9 is a top plan view of an alternative form of a base plate adapted to be used in connection with the spinning wheel in Figures 1 and 3, Figure 10 is a vertical sectional view of an alternative form of spinning wheel, Figures 11 and 12 are top plan views of alternative forms of base plates adapted to be used in connection with the spinning wheel shown in Figure 10, Figure 13 is a Fiber diameter vs. Temperature chart which in included herewith for the purpose of explaining some of the features of this invention, Figure 14 is a fragmentary partly sectional view showing details of a modified form of a spinning wheel, Figures 15 and 16 are top plan views of alternate forms of base plates which may be used with the spinning wheel shown in Figure 14, and Figure 17 is a vertical partly sectional view showing a modified form of spinning wheel.

In carrying out this invention, use is made of a settling chamber 20 which in its preferred form is preferably heat insulated in any suitable manner (not shown) and is provided with a foraminous conveyor 22 toward which newly formed fibers 24 may be drawn to become deposited and incorporated in an advancing mineral wool blanket 26 by means of any suitable suction apparatus 28.

This suction apparatus preferably includes a suction pan 30, an intake conduit 32, a motor driven blower 34, and a discharge conduit 36 which may be operatively connected together substantially as shown or in any other suitable manner. The intake conduit 32 is provided with a damper means 38 whereby the rate at which the air and gasses are withdrawn from the blow chamber may be controlled by the spinning operator.

In carrying out our invention, we preferably make use of a plurality of hereinafter described spinning wheels, each of which may be interchangeably or alternatively used with the blow chamber 20 in a manner which will become apparent as the specification proceeds. One of these spinning wheels is shown in Figures 1 to 6 inclusive; the others are illustrated in Figures 9 to 12 and 14 to 17 inclusive.

In order to more efficiently make use of these spinning wheels the blow chamber 20 is provided with a spaced apart cover member 40 which may, if desired, be formed and positioned substantially as shown. This cover member, at its upper portion is provided with a large centrally positioned circular open portion 42 through which extends a tubular shaft 44 (See Figure 3) of a spinning wheel mechanism 46.

This mechanism 46, which is hereinafter more fully described, includes a spinning wheel 48 which is adapted to continuously receive a stream of lava 50 and to centrifugally spin this stream into fibers. The spinning wheel 48 is also designed to aid one or more steam or air blasts in shredding the molten lava from the stream into mineral wool fibers, in a manner which will be more fully described as this specification proceeds.

Above the open portion 42, the cover member 40 is preferably provided with a lower movable cover plate 51 and an upper movable cover plate 52. The lower cover plate is slotted at 54 to provide an elongated opening through which the shaft 44 extends and through which the stream of lava may be poured upon the spinning wheel. These two cover plates are adapted to be so adjusted that the amount of air drawn into the blow chamber may be controlled at the will of the operator. The upper cover plate 52, of course, serves to restrict the admission of air drawn into the chamber through the slotted portion of the lower cover plate 51.

Below the open portion 42 of the cover member there is provided an annular nozzle means 56 which may be of any suitable construction, but preferably includes a plurality of adjacent hollow annular chambers 58, 60, 62, and 64 which may be either co-axial or concentric with each other and are provided with annular orifices 66. These orifices are adapted to direct downwardly one or more circular steam or air blasts (as may be desired) around the spinning wheel for the purpose of aiding the spinning wheel in the formation of fibers.

Each of these orifices may be provided with any suitable valve means 68 whereby the volume of blast fluid passing through these orifices may be controlled by the operator for a purpose hereinafter described by merely adjusting their valve wheels 70.

These chambers are adapted to be operatively connected to any suitable steam or compressed air supply means (not shown) by means of a main blast fluid supply conduit 72 and branch supply conduits 74, 76, 78, and 80. These branch supply conduits are respectively provided with any suitable throttle or valve means 82, 84, 86, and 88 whereby a blast of steam or air may be directed through any one or all of the nozzle orifices 66 with the force and the volume desired in the spinning of the fibers.

A main supply conduit, 90, having a plurality of branch supply pipes 92, 94, 96 and 98 connected thereto, is also provided for the purpose of treating the mineral wool with suitable fiber treating liquids, such as, for instance adhesives or waterproofing compounds. The supply conduit 90 is designed to be connected to any suitable reservoirs or other sources of supply of these treating fluids (not shown) and the branch supply pipes leading from this conduit are preferably provided with any suitable valves 100, 102, 103, and 104.

The cover member 40 is provided with a side wall 105 which extends downwardly from its flat top portion 106 in a spaced apart relationship to surround a circular upper wall portion 108 of the blow chamber in a manner adapted to provide an annular shot receiving chamber 110. The accumulated shot may be removed from this chamber through any suitable openings, such as for instance, cut away side wall portions 112 having hinged door means 114 which may be secured in their closed position by any suitable means 116. This cover member may be supported in its position by any suitable means, such as, for instance brackets 117 which project from the walls of the blow chamber.

The circular upper wall portion 108 of the blow chamber is preferably cylindrical in shape and may be provided at its upper end with a telescopically mounted tubular extension 118 having an inwardly curved top portion 120. This extension is adapted by any suitable adjustably mounted supporting means 122 to be raised and lowered at the will of the operator for a purpose hereinafter described.

The upper wall portion 108 is connected or joined at its lower end to a mid-wall portion 124 in any suitable manner, such as for instance by welding. This mid-wall portion is preferably circular in shape in its upper end, but is flared outwardly and downwardly in such a manner that its lower end is rectangular in shape and joins a bottom wall portion 126. This bottom wall portion includes a rear wall 128, a frontwardly extending cover portion 130 and side walls 132, the last of which may extend to the front end of the conveyor, substantially as shown. A frontwardly extending covering plate 134 is hingedly secured at one end to the front end of the cover portion 130 and its other end is adapted to ride upon a compression roller 136 which compacts the fibers in the blanket 26 as this blanket leaves the settling chamber. This compression roller is provided with a shaft 138 which is mounted on pivoted arms 140 which may be swingedly supported by any suitable means 142.

Referring now to Figures 3 to 6 inclusive, the alternative form of the spinning wheel mechanism 46 includes, as has been previously stated, the tubular shaft 44. This shaft is closed at its upper end and is provided with a plurality of radially extending openings 144 (see Figure 5) which are designed to admit steam or compressed air or any suitable adhesives or waterproofing fluids to the interior of the shaft. Water may also be admitted in certain instances for the purpose of cooling the spinning wheel mechanism or reducing the temperature inside the blow chamber.

This tubular shaft is also provided near its upper end with any suitable packing box construction 146 for the purpose of providing means whereby the before mentioned fluids may be supplied to the interior of the shaft of the spinning wheel through the openings 144. This packing box is operatively but detachably connected to a steam or compressed air pipe 148 by a flexible coupling 150 and a nipple 151 for the reason that the spinning wheel mechanism and the other alternative forms of spinning mechanisms here-after described are adapted to be raised or lowered by any suitable pivotally mounted lifting mechanism 152. This pipe 148 is operatively connected to the main steam or compressed air supply pipe 72 and is preferably provided with any suitable throttle valve 154.

A pipe 156 having a valve 158 is operatively connected to the adhesive or waterproofing supply pipe 90 and to the steam or compressed air pipe 148 in order that adhesives and waterproofing materials may be applied to the wool through the spinning wheel mechanism at the will of the operator.

The tubular shaft of the spinning wheel mechanism is also preferably provided with any suitable water jacket 160 for the purpose of preventing this shaft from becoming overheated by the incandescent lava which falls on the spinning wheel. This water jacket may include an inner wall 162 and an outer wall 164 which are closed at either end to provide a stationary annular water chamber 166. This water chamber is operatively connected by a flexible inlet conduit 168 to any suitable water supply system (not shown). A flexible water conduit 169 is also provided through which the water may be discharged from the chamber.

These flexible conduits are employed for the reason that the spinning wheel mechanism is designed to be moved either vertically or horizontally at the will of the operator.

The tubular shaft 44 is rotatably connected at its upper end to the water jacket by any suitable ball bearing means 170, and is connected at its lower end to the tubular shaft by a ball or roller bearing means 172. This latter mentioned ball bearing means is adapted to rotatably support the tubular shaft by having its outer shell 174 and its inner shell 176 piece fitted respectively to the inner wall of the water jacket and to the tubular shaft in a manner well understood by the art.

The spinning wheel 48 may be made of any suitable construction, but the preferred form shown in Figure 3 includes an upper circular spinning wheel portion 178 which is integrally formed with the tubular shaft. This wheel portion includes a web 180, a rim 182, and a centrally positioned recessed portion 184. This recessed portion is adapted to receive a centering boss 186 forming a part of a base plate 188 which is detachably secured to the lower side of the upper spinning wheel portion by any suitable means, such as for instance, the threaded bolts 190 and spacer washers 192. The centering boss 186 is provided with any suitable openings, such as a plurality of slotted or re-entrant portions 194, for the purpose of admitting steam or compressed air into a narrow space 196 provided between the spinning wheel portion and the spaced apart base plate 188.

The inner lower surface of the rim of the upper spinning wheel portion 178 (see Figures 3 and 4) is preferably tapered downwardly and outwardly substantially as shown. The peripheral portion of the base plate 188 may be spaced apart from but parallel to the adjacent surfaces of the upper spinning wheel portion for the purpose of guiding the steam, air, and any other fluids employed outwardly and downwardly from the spinning wheel in a manner adapted to aid in the formation and the deposition of the fibers in a manner yet to be described.

The spinning wheel mechanism may be driven by any suitable means whereby it may be rotated at varying angular velocities, such as for instance, a variable speed drive mechanism 191 and a motor 193. The shaft 195 of the speed drive mechanism is preferably connected to the tubular shaft by any suitable detachably secured clutch means 197 to permit these two shafts to be disconnected from each other, when repairs are necessary or when an alternative form of spinning wheel is to be employed.

The spinning wheel mechanism, 46, the speed drive mechanism 191 and the motor 193 detachably associated therewith are bolted or otherwise detachably secured to and carried by the before mentioned lifting mechanism 152 in any suitable manner whereby the spinning mechanism may be moved both vertically and horizontally and then be rigidly secured in its desired position. This lifting mechanism preferably includes an inner arm member 198 and an outer arm member 200, the first of which may be detachably bolted to any suitable stationary supports 202. This inner arm member is preferably provided with an upper horizontally extending portion 204 which is adapted to slidably receive an elongated bolt 206 which is threaded in its upper portion 208 and is square in cross section in its lower portion 210. This bolt is provided with a head 212 at its lower end for supporting the outer arm member 200 and is also provided with an internally threaded disk or wheel 214 which provides means whereby the bolt may be raised and lowered in a manner which will be readily understood by referring to Figure 1.

The inner arm member is also provided with a lower horizontally extending arm 216 which is provided with a square recessed portion (not shown) adapted to slidably but nicely receive the square portion of the bolt. The outer arm member 200 is provided with an inwardly and horizontally extending upper arm 218 and a similar lower arm 220 each of which are provided with square recessed portions (not shown) adapted to be snugly fitted around the square portion of the elongated bolt in such a manner that the spinning wheel mechanism may be prevented from moving horizontally during the spinning operation except when it is desired to shift the spinning wheel off center for purposes yet to be described. In order to move the spinning mechanism, it is only necessary to slightly loosen the bolts 222 whereby the inwardly extending arm is secured to the stationary supports 202.

The above mentioned outer arm member 200 is preferably longer and extends upwardly further than the inner arm member 198 and is provided with a plurality of bolt holes (not shown) in order that the motor 193 and the variable speed drive 191 may be raised and adapted to be connected to the yet to be described spinning wheel shown in Figure 17. This spinning wheel may have a slightly longer shaft and is especially adapted to be used when two or more mutually reactive adhesives are employed for purposes yet to be described.

From the above description it will be seen that the spinning wheel mechanism may be moved either horizontally or vertically and supported in any desired position at the will of the operator.

In order to enable the operator to determine the angular velocity of the spinning wheel a speedometer 224 having a large dial may be operatively connected to the tubular shaft substantially as shown. This speedometer and the variable speed drive together provide means whereby the annular velocity of the spinning wheel may be held at or changed to any desired number of R. P. M.

For the purpose of better enabling the operator to determine the spinning conditions a swingably mounted window 228 may be provided whereby the operator may observe the conditions within the blow chamber and may from time to time withdraw samples of newly formed fibers for the purpose of better determining the viscous conditions of the lava and the characteristics of the fibers being formed.

In order to provide better vision any suitable flood light 230 may also be provided. This flood light may, if desired, be mounted substantially as shown around an open portion 232 which is provided in the walls of the blow chamber.

Referring now to Figure 7, it will be noted that each of the outer nozzle chambers 60, 62, 64 are provided with cut away portions 234 and that the upper portion of the cover plate, to which these nozzle members are fixedly secured by any means (not shown), is provided with aligned openings 240. These openings are provided for the purpose of enabling the operator to visually estimate or determine the temperature of the lava immediately before it is shredded by any particular annular blast. In practice, of course, this temperature should be from time to time more accurately determined by an optical pyrometer.

The main blast fluid supply pipe 72 is preferably provided with a variable pressure regulator 242 having a dial 244. This arrangement, in combination with the various other throttle and nozzle orifice valves, provide means whereby both the pressure and the volume of the steam blasts may be regulated as may be desired by the operator.

A cold water pipe 248 forming a part of a cold water supply system (not shown) and having a throttle valve 249 may be operatively connected to the main steam supply pipe 72 for the purpose of reducing the temperature of the shredding blast and the temperature of the blow chamber when such reduction of temperature is desired. We have also provided throttle valves 250 and 251 which are operatively connected respectively to the blast and adhesive supply conduits 72 and 90 for the purpose of providing means whereby the fluids and adhesives passing through these conduits may be directed solely through the hollow shaft 44 and the spinning wheel 46 when the annular blast nozzles are not being used.

Referring now to Figure 9 we have provided an interchangeable and alternative form of base plate 260 which is particularly adapted to be used instead of the base plate 188, when it is desired to give a reaction turbine effect to the spinning wheel 48 or to provide an entirely different and a yet to be described spinning wheel operation or to substantially increase the fiber producing capacity of the spinning apparatus.

This base plate 260 may be identical with the base plate 188 except that it is provided at or adjacent its circumferential portion with a plurality of spaced apart turbine reaction vanes 262 which may be either integrally formed with the plate substantially as shown or may be fixedly secured thereto in any other suitable manner. These vanes are so formed that when the base plate 260 is substituted for the base plate 188 that they extend outwardly to, or substantially to, the inner lower surface of the upper spinning wheel portion 178 in a manner to produce a reaction turbine effect which not only tends to drive the spinning wheel forward in the direction indicated by the arrow 263 but also very definitely blows or draws the fibers backwardly as they are being spun and thereby produces finer and/or longer fibers (in a manner yet to be described) and at the same time very substantially increases the fiber producing capacity of the spinning wheel.

Here it may be noted that one of the major defects of conventional spinning wheels is that their inherent spinning capacities are small. It is due to these low capacities, more than any other of their limitations, that the centrifugal spinning method has not been generally used by the industry.

Applicants believe that their "reaction turbine" method of obtaining a greater capacity is in itself an extremely important advance in the art, for the reason that this blowing of the fibers backward by the blast issuing between the vanes is, in itself, adapted to shred or to spin the mineral wool fibers from a molten stream even when the wheel is stationary, and, when the wheel is being rapidly rotated, the spinning capacity of the wheel is, in effect, added to the shredding capacity of the blast or blasts issuing from the wheel.

As has been previously mentioned, we have provided a number of alternative types of spinning wheels each of which is adapted to be used in one or more spinning operations.

One such spinning wheel is shown in Figure 10. This spinning wheel 265 is provided with a shaft portion 266 which may be identical in construction with the shaft portion 44 shown in Figures 1 and 3 except that it is connected to a different form of upper spinning wheel portion and is adapted to be used with a plurality of heretofore undescribed base plates. Its spinning wheel portion 268 is preferably integrally formed with the shaft and includes a depressed web portion 270, a preferably thin outwardly extending rim portion 272 and a cut-back and centrally recessed portion 274 which may be substantially the same as the recessed portion 184 provided in the upper spinning wheel portion 178 of the spinning wheel 48.

The recessed portion 274 is adapted to receive a centering boss 278 which forms a part of a base plate 280 which may be secured to the lower side of the upper spinning wheel portion in the manner which has been fully disclosed in the description of the spinning wheel 48.

The base plate 280 includes a web 282, an outwardly inclined wall portion 284, and an outwardly extending rim portion 286. This rim portion is preferably, although not necessarily, made wider than the rim portion of the adjacent spinning wheel portion in order to provide a supporting base for the steam blast issuing between said spinning portion and said base plate in a manner which may be well understood by referring to Figure 10. This type of spinning wheel is adapted to be used interchangeably with the spinning wheel apparatus shown in Figures 1 to 6 inclusive and it is especially designed to make an efficient use of the energy of the air or the steam blast 288 issuing between the upper and lower portions of this spinning wheel.

In Figures 11 and 12 we have depicted two alternative forms of base plates, 290 and 292 respectively, each of which are adapted to be used instead of the base plate 280 shown in Figure 10. Each of these base plates may be identical in construction with the above mentioned base plate 280 except that inwardly extending blades or vanes are provided which may be integrally formed with their base plates intermediate of their web portions and rim portions, substantially as shown.

The vanes 294 of the base plate 292 preferably extend upwardly and radially from its web portion 295 to its rim portion 296 (see Figure 12) and the vanes 297 of the base plate 290 (see Figure 11) are preferably of the reaction turbine type and incline upwardly and rearwardly from its web portion to provide a reaction turbine effect. When the spinning wheel is being rotated with the base plate 292, the fluid or blast issuing from the spinning wheel is rotated with the wheel by its vanes 294 in the direction in which the wheel is rotating. The vanes 294 of the base plate 290, of course, direct the steam or air blast rearwardly in much the same manner as do the vanes of the base plate shown in Figure 9.

It should be noted, however, that both the vanes 294 and 297 are preferably positioned intermediate of the rim and the web portions of their plates to permit the separated streams of gases passing between their vanes to become more or less reunited in the form of an annular blast when the blast fluid passes out of the spinning wheel, whereas, when the plate 260 is used, the streams separated by its vanes 262 remain separated until after they have passed out of the spinning wheel apparatus.

In Figure 14 we have shown a spinning wheel 298 having a shaft 300 which is substantially the same as the tubular shaft 44 shown in Figures 1 and 3. This shaft is preferably integrally formed with a more or less saucer shaped upper spinning wheel portion 301 to which there is operatively and detachably connected a saucer shaped base plate 302 which is spaced apart from the spinning wheel portion 300 in a manner which will be thoroughly understood by referring to Figure 14. The rim portion 303 of the upper spinning wheel portion 301 preferably extends slightly above the corresponding rim portion 305 of this lower base plate for the purpose of preventing the molten lava thrown off of the wheel from coming in contact with and possibly being chilled by and frozen to the rim of this base plate. This arrangement also serves the further purpose of imparting different spinning characteristics to the spinning apparatus.

In Figures 15 and 16 we have shown alternative forms of base plates 308 and 310 which are adapted to be used instead of the base plate 302. The base plate 308 is provided with a plurality of radially extending vanes 312 and the base plate 310 is provided with vanes 314 of the reaction type. Each of these vanes are preferably located well within the rim portions of their base plates for the same purpose as are the vanes of the base plates shown in Figures 11 and 12, that is, to provide a more even and continuous annular stream or blast.

In Figure 17 there is depicted a spinning wheel 318 which is especially adapted to be used when two or more mutually chemically reactive substances are to be used as a suitable waterproofing or adhesive mixture or compound, such as for instance, a solution of rosin and sodium silicate which react upon each other in such a manner that the mixture becomes too granular or lumpy to be readily passed through small conduits or evenly distributed on the mineral wool fibers in a settling chamber.

The difficulties of applying mutually reactive substances are discussed in detail in the D. C. Drill et al. U. S. Letters Patent No. 2,214,768 and in that patent it is disclosed that when the mutually reactive ingredients are separately applied or are intermixed immediately before application, a far more even coating of the fibers may be obtained.

The spinning wheel 318 may be constructed in any suitable manner whereby liquids may be kept separated while they are passing through the wheel, but it preferably includes an outer and an inner tubular shaft to provide two separate fluid conduits through which fluids may be passed through the wheel.

The outer tubular shaft 320 has a saucer shaped spinning wheel portion 322 which may be almost identical with the spinning wheel portion 300 illustrated in Figure 14. This outer shaft preferably has a water jacket (not shown) whereby this shaft may be cooled and may be operatively secured to the arm 220 of the lifting mechanism 152. This water jacket is preferably identical, except in size with the water jacket 160 shown in Figures 1 and 5 as is shown in Figure 17. The upper end of this shaft is secured in a gas tight manner to an inner tubular shaft 324 by any suitable means, such as for instance, by welding.

The outside diameter of this inner tubular shaft is appreciably smaller than the inside diameter of the outer tubular shaft for the purpose of providing an annular conduit 326. This smaller shaft is provided at its lower end with a saucer shaped portion 327 which is spaced apart from the saucer shaped spinning portion of the longer shaft by any suitable means such as, for instance, by a centering boss 328 and washer spacers 330 of the type heretofore described.

A saucer shaped base plate 332 is spaced apart from the middle saucer shaped portion 327 by the same method and the three saucer shaped elements are rigidly secured together by any suitable means such as, for instance, by bolts 334.

These outer and inner shafts are respectively provided with suitable packing box constructions 336 and 338 and with open portions (not shown) which may be similar to the packing box construction 146 and the open portions 144 shown in Figure 5. The upper end of the smaller tubular shaft is closed and is provided with a preferably detachably connected clutch 339 whereby the shaft may be driven by the motor driven variable speed drive means 191. One of the packing box constructions may be connected to the flexible hose 150 and the other may be connected by a flexible hose 342 to a conduit 344 forming part of a second liquid supply system (not shown) which is adapted to provide either fluid adhesives or fluid waterproofing materials. This conduit 344 may be provided with any suitable valve 346 and may be operatively connected to the adhesive supply conduit 90 by a connecting pipe 348 which is also preferably provided with a valve 350. The providing of two separate sources of supply and operatively connecting them together has several advantages. For instance, when in the factory, the production unit is assigned to make another product requiring the use of a different type of adhesive the change can often be made by merely closing and opening a few valves instead of shutting down the production unit.

It will of course be understood that any prolonged interruption in production in a mineral wool production unit is an expensive and very annoying procedure, for when these interruptions occur the cupola continues to pour out its white hot lava on the floor or elsewhere and the cupola's "bottom" must be tapped to prevent the lava from becoming frozen in the cupola.

Referring once more to Figure 1, it will be noted that the discharge conduit 36 of the suction apparatus 28 is operatively connected to the side wall 105 of the cover member 40 by a large pipe 354 and an annular tuyère-like air discharge conduit 356. This conduit 356 communicates with the cover member 40 through any suitable means such as, for instance, a plurality of spaced apart openings 357 through which the previously withdrawn air and gases may be admitted and more or less evenly distributed within the cover member before they finally pass into the interior of the settling chamber beneath the annular nozzle construction and above the telescopically mounted tubular extension 118.

In order to provide a still more even distribution of these incoming gases around the spinning wheel, the cover member 40 is preferably provided with a downwardly and outwardly extending annular baffle member 358 whereby these incoming gases may be first deflected downwardly and then upwardly before they enter the interior portions of the settling chamber proper. This arrangement also has the advantage of providing means whereby any fibers having shot attached thereto may be separated from the shot by reason of the outwardly projected shot striking against this baffle member and it has the additional advantage that any detached or loose fibers drawn into the shot receiving chamber by any means may be carried back into the interior of the blow chamber by these incoming gases and become deposited on the movable conveyor.

The pipe 354 is preferably provided with any suitable damper means 360 which, in combination with the damper 361 of the discharge conduit 36, enables the operator to direct any desired proportion of the withdrawn gases either into the outer atmosphere or back into the settling chamber. In order to provide specific means whereby an extremely high temperature may be consistently maintained in the settling chamber, the pipe 354 is operatively connected to a hot air or hot gas supply conduit 362 which is in turn connected to any suitable means (not shown) whereby a continuous stream of highly heated gases may be fed into the settling chamber. One simple way whereby these highly heated gases may be provided is to operatively connect any suitable fuel blast burner means to the conduit 362 which is preferably provided with an inner refractory lining (not shown). It will be noted that the above described feed back and hot air or gas supply means are adapted not only to aid in maintaining the settling chamber in a highly heated condition but to also maintain the pressure within the settling chamber at or above atmospheric pressure when it is desired to prevent cold air from entering into the settling chamber through the open portion in the cover member 40 or through any other openings in the settling chamber.

It is at times highly desirable that the interior of the blow chamber be maintained at such a high temperature that the newly formed fibers will be deposited on the movable conveyor before these fibers have become completely solidified and while they are yet in a slightly sticky or viscous condition. It will be found that when the fibers are deposited in this condition and are then compressed by any suitable means, such as the compacting roller 136, that they become in effect adhered or welded together in such a manner as to provide a fibrous heat insulating board or batt which is adapted to withstand high temperatures at which any available organic binding material would be burnt or destroyed. This arrangement for maintaining a high temperature within the blow chamber also has the advantage that suitable mineral adhesive materials having a relatively high melting point may be used as a binding substance such as aluminum silicate componds, frit, or enameling materials.

From the above description of our settling chamber and its various spinning wheel attachments, it will, of course, be readily understood that any one of the spinning wheels may be employed and may be rotated at various operating speeds and held in various operating positions in relation to the orifices of the annular nozzle construction.

It is also apparent that the power, volume, and velocity of each shredding stream or blast may be consistently controlled and maintained at any desired operating level within close limits and that an annular blast from the annular blast nozzle means may be applied to the molten mass at any desired viscosity within the fluid range of the particular "run" or batch of molten materials being fiberized.

This flexible construction provides many advantages which are not found in any apparatus or combination of apparatus heretofore known to the applicants. Among these advantages is the fact that the annular mass or sheet, including any fibers extending therefrom, may be projected at any desired operating distance beneath the annular orifice being used. This, of course, enables the operator to subject this annular mass or sheet to the fluid annular blast at the point on the descending blast having the desired velocity inasmuch as the velocity of a blast progressively decreases shortly after it leaves its orifice. It is evident that in order to shred the mass at the desired velocity, it is only necessary to provide a blast having a velocity above that at which the lava is to be shredded and then lower the wheel until the annular molten mass is projected against the blast at the vertical level having the desired velocity.

This flexible arrangement also provides means whereby a mixture of fibers having different diameters and other physical characteristics may be obtained from the same wheel at the same time by moving the center or shaft of the wheel off center with respect to the center of the annular nozzle construction. When this is done, it is obvious that the blast from any one of the annular nozzles may be readily applied to the annular mass at different temperatures and therefore at different viscosities and that since the temperature of the annular mass decreases as it moves outwardly, fibers having relatively small diameters will be formed at the point where the annular nozzle is the closest to the circumference of the wheel. It is equally evident that the opposite of this statement is true.

It will also be noted that the blow chamber is preferably heat insulated and that various means are provided whereby the pressure and the temperature of the atmosphere in the blow chamber may be widely varied.

Attention is also directed to the fact that the heretofore described base plates having turbine vanes of the reaction type provide means whereby much higher annular velocities may be imparted to the wheel by the force of the rearwardly directed blast. This is particularly true if the wheel be first disconnected by its clutch from the variable speed drive means, 191.

Attention is also called to the fact that the provision of a stream or blast suitably projected beneath its spinning surface materially increases the fiber spinning capacity of the wheel and, when the blast is directed rearwardly from the wheel by any suitable means such as, for instance, blades of the reaction turbine type, that the spinning wheel is particularly adapted to produce long fibers at a very rapid rate.

It will, of course, be understood that each type of spinning wheel herein disclosed is well adapted to form mineral wool fibers either by centrifugal force alone or by the joint application of centrifugal force and one or more shredding blasts.

It will also be understood that each of the spinning wheels may be held stationary and that the lava may be poured upon the spinning wheel and shredded either by its own shredding blast or by a combination of its own shredding blast and one of the downwardly directed blasts issuing from the annular blast nozzle construction.

Referring now more particularly to the type of spinning wheel shown in Figures 1 to 5 inclusive, this wheel is particularly adapted to spin mineral wool fibers by throwing the molten material off of the wheel and thereafter subjecting it to the action of the blast issuing from this spinning wheel and one of the downwardly descending blasts issuing from the annular blast nozzle construction. Under these conditions the molten annular sheet or mass will, of course, be subjected on both sides to a shredding force in a manner adapted to enormously increase the shredding capacity of the spinning wheel. It will, of course, be understood that the velocity of the wheel and the particular annular blast used will be determined by the type of fiber it is desired to produce.

It will also be understood that the type of spinning wheel shown in Figure 10, in combination with the annular blast nozzle construction, is particularly adapted to gradually accelerate the molten mass in such a manner as to provide a larger output of extremely long fibers with this type of wheel. The molten mass may be first thrown off of the wheel at a relatively low radial velocity by centrifugal force then accelerated by a fluid stream issuing from the spinning wheel at a relatively low or medium velocity and finally subjected to a descending annular blast having a somewhat higher but not sufficient velocity to tear the elongated strands into short sections.

Referring now to Figure 14 the wheel 298 is well adapted to provide an almost ideal distribution of any suitable fluid binding material on mineral wool fibers passed through the wheel by reason of the fact that the annular mass tends to move radially from the wheel while the binder tends to move upwardly.

This wheel also provides means whereby substantially the same spinning effect may be obtained as would be obtained were additional outer nozzle orifices employed by reason of the fact that a blast issuing from this wheel is directed both upwardly and outwardly from the wheel in a manner adapted to cause the molten materials of the annular mass or sheet to move a greater distance from the wheel before they are subjected to a blast issuing from the blast nozzle construction 56.

It is also apparent that by varying the velocity and force of the blast issuing from this wheel the period of time taken and the distance traversed by the molten material on its way from the wheel to the descending annular blast may be varied in such a manner as to obtain much the same effect as could be obtained were each of the circular annular nozzles 59, 60, 62, and 64 adapted to be contracted and expanded in circumference, as desired.

As has been before mentioned, the type of spinning wheel shown in Figure 17 is paricularly adapted to provide means whereby two mutually reactive adhesives (such as, for instance, an aqueous solution of sodium silicate and rosin cut with naphtha) may be simultaneously applied to the mineral wool fibers. As has been previously disclosed, some adhesives are mutually reactive and can not, in practice, be mixed together in a common reservoir before they are fed through the adhesive conduits for the reason that some of the products of reaction form gummy, lumpy or granular substances which do not freely flow through the conduits and can not be evenly coated upon the mineral wool fibers.

From the foregoing description of the various elements of the apparatus of our invention and their respective functions, the operation of the apparatus may be fully understood by those skilled in the art.

Before commercial production is started with a new batch of raw materials, it will be found advantatgeous to make a short preliminary test to obtain some definite working knowledge of the viscosity and other spinning characteristics of these materials and it is one of the advantageous features of our apparatus that it is particularly adapted to be used in making such a test. The exact nature of the test employed may, of course, be varied somewhat according to the type of wool it is desired to produce and certain "short cuts" may be made, but it is suggested that the test be made along the lines indicated below and that a record be preserved of the results of the test for future reference when dealing with identical or closely similar raw materials.

Now solely for the purpose of roughly illustrating one way in which one such test may be made and its findings may be applied, let us assume that it is desired to produce a type of fiber having, among its other characteristics, an average diameter of 5 microns. In making this test the operator preferably first directs the molten stream midway between its shaft and its circumference and then determines, preferably optometrically, the temperature of the lava stream at the point where it falls on the wheel, the temperature of the lava at the circumference of the wheel, and also, as nearly as possible, the temperature of the lava where it passes under each of the nozzle orifices of the annular nozzles 58, 60, 62, and 64. The operator should then separately apply each of the annular blasts and ascertain the approximate diameter of representative fibers formed by each blast.

In Figure 13 we have shown a more or less explanatory chart which illustrates how the lava may be shredded at any temperature best adapted to produce fibers of the desired diameter.

Now let us assume that in making this test the lava is preferably first poured on the wheel at A approximately midway between its circumference and its shaft and that the temperature of the lava and the diameters indicated at B, C, D, and E are those obtained when the lava is being poured on the wheel at A.

With the above information at hand, the operator notes that the diameter of representative fibers shredded by the blast nozzle 58 is approximately 4 microns and that the diameter of representative fibers shredded by the blast nozzle 60 is approximately 9 microns. He may then readily determine, either by interpolation (as is indicated at F) or by deduction, that the desired shredding temperature should be approximately 2760° F. which is 40° F. less than that under which the fibers were shredded by the blast from the nozzle 58. Inasmuch as the operator knows that the shredding temperature of the lava shredded by this blast may be decreased by moving the lava stream inwardly, he merely applies the blast 58 and shifts the stream inwardly until representative fibers having approximately the desired diameters are being produced; the stream is then held at this point (G) on the wheel as long as the conditions remain the same, after which he will make such adjustments as may be indicated in accordance with the teachings of our invention and the character of the fibers then being formed.

Now should the average length of the fibers produced be shorter than those called for by the specification, the operator decreases the strength of the shredding blast and makes such other minor adjustments as may be indicated by the character of the fibers being formed. If the fibers are longer than desired, he, of course, reduces the velocity of the shredding blast.

Should the operator desire to render the fibers more flexible, he increases the operating temperatures of the preferably heat insulated blow chamber and, if he wishes to make them more rigid, he decreases that temperature.

The manner in which each of the various blasts issuing from the spinning wheels may be employed either by itself or in combination with a blast from the annular nozzle construction has been previously described. It should be remembered, however, that by moving the stream of lava inwardly or outwardly on the spinning wheel the operator is enabled to subject the lava at various temperatures to the blast issuing from the spinning wheel. It should also be noted that when a blast from a spinning wheel is employed in combination with any one of the blasts issuing from the blast nozzle construction the spinning capacity of the wheel is materially increased by reason of the fact that each side of the molten lava stream is subjected to the action of a shredding blast.

The foregoing details have been given for the purpose of exemplification and not limitation since numerous modifications may be made in the apparatus and methods herein disclosed without departing from the spirit of our invention or the scope of the following claims.

In these claims it will be understood that the term "rapidly rotating" is used to mean rotating with a sufficiently high angular velocity and centrifugal force to throw the mass radially in the form of molten streams, which, when further attenuated oftentimes with the aid of a simultaneously applied shredding blast, may also assist in the formation of said streams. This interpretation is employed to distinguish from other methods in which the rotating surface is rotated quite slowly and is chiefly used to spread or distribute lava poured upon a downwardly inclined conical surface.

We claim:

1. The method of manufacturing mineral wool fibers from molten raw materials comprising forming a stream of said materials, shaping said stream by the application of centrifugal force into an outwardly moving thin mass or sheet, accelerating said outward movement of said sheet or mass by the application of a horizontally extending rapidly rotating annular outwardly directed fluid stream directed beneath said sheet or mass and thereafter changing the direction of the movement and increasing the velocity of the molten material of said sheet or mass with a downwardly directed cylindrical fluid blast encircling said mass or sheet to shred said molten material into solidified mineral wool fibers.

2. The method of forming mineral wool fibers from suitable molten materials comprising depositing a stream of said material on a rotating body turning in one direction to form an outwardly moving thin mass or sheet of said materials and thereafter subjecting said molten materials to a shredding blast directed outwardly with respect to said rotating body and rearwardly with respect to said direction of the rotation of said body with a reactive force sufficient to drive said rotating body in said direction of rotation.

3. A combined centrifugal spinning and blast apparatus adapted to form mineral wool fibers from suitable molten materials by the joint application of centrifugal force and a shredding blast, said apparatus including a rotatably mounted spinning wheel and a plurality of annular fluid blast nozzles encircling the axis of rotation of said spinning wheel, each of said nozzles being spaced outwardly from said wheel and being operatively and separately connected to a fluid blast supply system and being adapted to direct a shredding blast around said spinning wheel at an angle to the plane of rotation of said wheel, said spinning wheel being provided with an annular nozzle and a fluid conduit, said fluid conduit being adapted for connection to a fluid supply system, said annular nozzle being operatively and rotatably connected to said fluid conduit and being adapted to direct a fluid stream or blast outwardly from said wheel.

4. A combined centrifugal spinning and blast apparatus adapted to form mineral wool fibers from suitable molten materials by the joint application of centrifugal force and a shredding blast, said apparatus including a rotatably mounted spinning wheel and a plurality of angular fluid blast nozzles encircling the axis of rotation of said spinning wheel, each of said nozzles being spaced outwardly from said wheel and being operatively and separately connected to a fluid blast supply system and being adapted to direct a shredding blast around said spinning wheel at an angle to the plane of rotation of said wheel, each of said blast nozzle means being positioned at different distances from the axis of rotation of said spinning wheel, said spinning wheel being provided with a plurality of annular nozzles and a plurality of fluid conduits, said fluid conduits being adapted for rotatable connection to a fluid supply system, said annular nozzle being operatively connected to said fluid conduit and being adapted to direct a fluid stream or blast outwardly from said wheel.

5. A combined centrifugal spinning and blast apparatus adapted to form mineral wool fibers from suitable molten materials by the joint application of centrifugal force and a shredding blast, said apparatus including a rotatably mounted spinning wheel and a plurality of annular fluid blast nozzles encircling the axis of rotation of said spinning wheel, each of said nozzles being spaced outwardly from said wheel and being operatively and separately connected to a fluid blast supply system and being adapted to direct a shredding blast around said spinning wheel at an angle to the plane of rotation of said wheel, said spinning wheel being provided with an annular nozzle and a fluid conduit, said fluid conduit being adapted for connection to a fluid supply system, said annular nozzle being operatively connected to said fluid conduit and being adapted to direct a fluid stream or blast in a direction substantially opposite to the direction of rotation of said wheel.

6. A combined centrifugal spinning and blast apparatus adapted to form mineral wool fibers from suitable molten materials by the joint application of centrifugal force and a shredding blast, said apparatus including a rotatably mounted spinning wheel and a plurality of annular fluid blast nozzles encircling the axis of rotation of said spining wheel, each of said nozzles being spaced outwardly from said wheel and being operatively and separately connected to a fluid blast supply system and being adapted to direct a shredding blast around said spinning wheel at an angle to the plane of rotation of said wheel, said spinning wheel being provided with an annular nozzle and a fluid conduit, said fluid conduit being adapted for connection to a fluid supply system, said annular nozzle being operatively connected to said fluid conduit and being adapted to direct a fluid stream or blast in a direction substantially opposite to the direction of rotation of said wheel and in a manner adapted to drive said wheel in said direction of rotation.

7. Apparatus for making mineral wool fibers from a stream of suitable molten material by pouring said stream on a rapidly rotating body and discharging said molten material from said body into the path of a descending shredding blast, said apparatus including an annular blast nozzle, a spinning wheel mounted on the lower end of a vertically movable shaft having a vertical axis extending through said nozzle and means for raising and lowering said shaft to raise and lower said wheel beneath said nozzle in a manner whereby the material centrifugally thrown off said wheel may be subjected to said shredding blast at various operating levels beneath said nozzle, said means for raising and lowering said shaft including a support for said shaft, a supported arm member and a threaded means connecting said support with said arm member whereby said support may be raised and lowered with respect to said arm member.

8. Apparatus for making mineral wool fibers from a stream of suitable molten material by pouring said stream on a rapidly rotating body and discharging said molten material from said body into the path of a descending shredding blast, said apparatus including an annular blast nozzle, a spinning wheel mounted on the lower end of a vertically movable shaft having a vertical axis and extending through said nozzle and means for raising and lowering said shaft to move said wheel beneath said nozzle in a manner whereby material centrifugally thrown off said wheel may be subjected to said shredding blast at various operating levels beneath said nozzle, said means for raising and lowering said shaft including a support for said shaft, a supported arm member and a threaded means connecting said support with said arm member whereby said support may be raised and lowered with respect to said arm member, said threaded means including an externally threaded bolt and an internally threaded means mounted on said arm member and threadedly engaging said bolt.

9. Apparatus for making mineral wool fibers from a stream of suitable molten material by pouring said stream on a rapidly rotating body and centrifugally discharging said molten material from said body into the path of a descending shredding blast, said apparatus including an annular blast nozzle, a spinning wheel mounted on the lower end of a vertically and horizontally movable shaft having a vertical axis and extending through said nozzle and means for vertically and horizontally moving said shaft to move said wheel vertically and horizontally beneath said nozzle in a manner whereby the material centrifugally thrown off said wheel may be subjected at various operating levels and positions to said shredding blast beneath said nozzle, said means for moving said shaft including a support for said shaft, a pivotally mounted arm member and a threaded means connecting said support with said arm member whereby said support may be raised and lowered with respect to said arm member.

10. Apparatus for making mineral wool fibers from a stream of suitable molten material by pouring said stream on a rapidly rotating body and centrifugally discharging said molten material from said body into the path of a descending shredding blast, said apparatus including an annular blast nozzle, a spinning wheel mounted on the lower end of a horizontally and vertically movable shaft having a vertical axis and extending through said nozzle and means for moving said shaft to move said wheel beneath said nozzle in a manner whereby the material centrifugally thrown off said wheel may be subjected to said shredding blast at various operating levels and positions beneath said nozzle, said means for raising and lowering said shaft including a support for said shaft, a pivotally mounted arm member and a threaded means connecting said support to said arm member whereby said support may be raised and lowered with respect to said arm member, said threaded means including an externally threaded bolt and an internally threaded means mounted on said arm member and threadedly engaging said bolt.

DANIEL C. DRILL.
CARLTON C. DAVIS.